US008266166B2

(12) United States Patent
Barker et al.

(10) Patent No.: US 8,266,166 B2
(45) **Date of Patent: *Sep. 11, 2012**

(54) MECHANISM FOR CONVERTING AFTER IMAGE DATA TO A DELTA LEVEL CHANGE

(75) Inventors: Kevin Spencer Barker, Raleigh, NC (US); Christopher Shane Claussen, Austin, TX (US); Zeenat Kulkami, Redwood City, CA (US); Yang Zhong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 293 days.

This patent is subject to a terminal disclaimer.

(21) Appl. No.: 12/392,522

(22) Filed: Feb. 25, 2009

(65) Prior Publication Data

US 2009/0157719 A1 Jun. 18, 2009

Related U.S. Application Data

(63) Continuation of application No. 11/187,044, filed on Jul. 22, 2005, now Pat. No. 7,499,947.

(51) Int. Cl.
*G06F 7/00* (2006.01)
*G06F 17/30* (2006.01)

(52) U.S. Cl. ....................................................... 707/756

(58) Field of Classification Search .................. 707/756, 707/999.104

See application file for complete search history.

(56) References Cited

U.S. PATENT DOCUMENTS

| | | | | |
|---|---|---|---|---|
| 5,375,196 | A | 12/1994 | Vatti et al. | |
| 6,151,410 | A | 11/2000 | Kuwata et al. | |
| 6,614,428 | B1 | 9/2003 | Lengyel | |
| 6,643,640 | B1 | 11/2003 | Getchius et al. | |
| 7,020,649 | B2 | 3/2006 | Cochrane et al. | |
| 7,191,184 | B2 | 3/2007 | Laborde et al. | |
| 2002/0099735 | A1 | 7/2002 | Schroeder et al. | |
| 2002/0165724 | A1 | 11/2002 | Blankesteijn | |
| 2006/0101423 | A1 * | 5/2006 | Aharoni et al. | 717/136 |
| 2006/0130047 | A1 | 6/2006 | Burugapalli | |

OTHER PUBLICATIONS

Spackman et al., "Enterprise Integration Solutions", Aug. 25, 2004, Microsoft Press, 1-14.

* cited by examiner

*Primary Examiner* — Aleksandr Kerzhner
(74) *Attorney, Agent, or Firm* — Yee & Associates, P.C.; Prentiss W. Johnson

(57) ABSTRACT

A mechanism is provided for converting after image data into a delta level change. An after image business graph is first transformed into a generic after image business graph. Another transformation is performed transforming the generic after image business graph into a second after image business graph, using delta information from another enterprise information system is used to create a delta business graph. A final transformation is performed to convert the delta business graph into a generic delta business graph.

17 Claims, 5 Drawing Sheets

MECHANISM FOR CONVERTING AFTER IMAGE DATA TO A DELTA LEVEL CHANGE

This application is a continuation of application Ser. No. 11/187,044, filed Jul. 22, 2005, status allowed.

BACKGROUND OF THE INVENTION

1. Field of the Invention

The present invention relates generally to after image data. Still more particularly, the present invention provides a mechanism to convert after image data to a delta level change.

2. Description of the Related Art

The Service Data Objects (SDO) framework provides a unified framework for data application development. With a Service Data Objects framework, a user does not need to be familiar with a technology-specific application protocol interface (API) in order to access and utilize data. A user needs to know only one application protocol interface, the Service Data Objects framework application protocol interface, which lets the user work with data from multiple data sources, including relational databases, entity Enterprise JavaBeans (EJB) components, Extensible Markup Language (XML) pages, Web services, the Java™ Connector Architecture, JavaServer™ Pages pages, and more.

Although the word "framework" is used, framework is analogous to the Eclipse framework. Eclipse is designed so that tools can be integrated together thanks to its solid and extensible base. The Service Data Objects framework is similar in the sense that it provides a framework to which applications can be contributed and these applications will all be consistent with the Service Data Objects framework model.

Unlike some of the other data integration models, the Service Data Objects framework does not stop at data abstraction. The Service Data Objects framework also incorporates a good number of Java™ 2 Platform Enterprise Edition (J2EE™) patterns and best practices, making it easy to incorporate proven architecture and designs into user applications. For example, the majority of Web applications today are not (and cannot) be connected to backend systems 100 percent of the time; so the Service Data Objects framework supports a disconnected programming model. Likewise, today's applications tend to be remarkably complex, comprising many layers of concern.

Extensible Markup Language (XML) is becoming ubiquitous in distributed applications. For example, the Extensible Markup Language Schema (XSD) is used to define business rules in an application's data format. Also, the Extensible Markup Language itself is used to facilitate interaction: Web services use the Extensible Markup Language based Simple Object Access Protocol (SOAP) as the messaging technology. Extensible Markup Language is a very important driver of Service Data Objects framework and is supported and integrated in the framework.

Data objects are the fundamental components of the Service Data Objects framework. Data objects are the Service Data Objects framework representation of structured data. Data objects are generic and provide a common view of structured data built by a data mediators services (DMS). Data objects hold their "data" in properties. Data objects are linked together and contained in data graphs.

Data graphs provide a container for a tree of data objects. They are produced by the data mediators services for the Service Data Objects framework clients to work with. A data graph contains a root data object, all of the root's associated data objects, and a change summary (more on change summaries in a moment).

An Enterprise Information System (EIS) is comprised of applications that comprise the existing system of an enterprise for handling company-wide information. Examples of enterprise information systems include: an enterprise resource planning (ERP) system, a mainframe transaction processing system, and a legacy database system. A hub is a virtual data area between different enterprise information systems where data in a format of the particular enterprise information systems may be converted to data in a format of another enterprise information system.

Data that flows around a hub may have three different natures:

1. A simple business object that represents non-enriched data.
2. A business graph that represents after image data, which represents changes to the business objects in the business graph.
3. A business graph that represents delta data which reflects all property and business object changes.

There are scenarios where an application requires delta level changes but the data it needs is in an enterprise information system after image format.

SUMMARY OF THE INVENTION

The different aspects of the present invention provide a method, data processing system, and computer usable code for converting after image data into a delta level change. A first after image business graph is transformed from an enterprise information system into a generic after image business graph. Another transformation of the generic after image business graph into a second after image business graph is performed. Delta information from another enterprise information system is used to create a delta business graph. Yet another transformation is performed to convert the delta business graph into a generic delta business graph

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
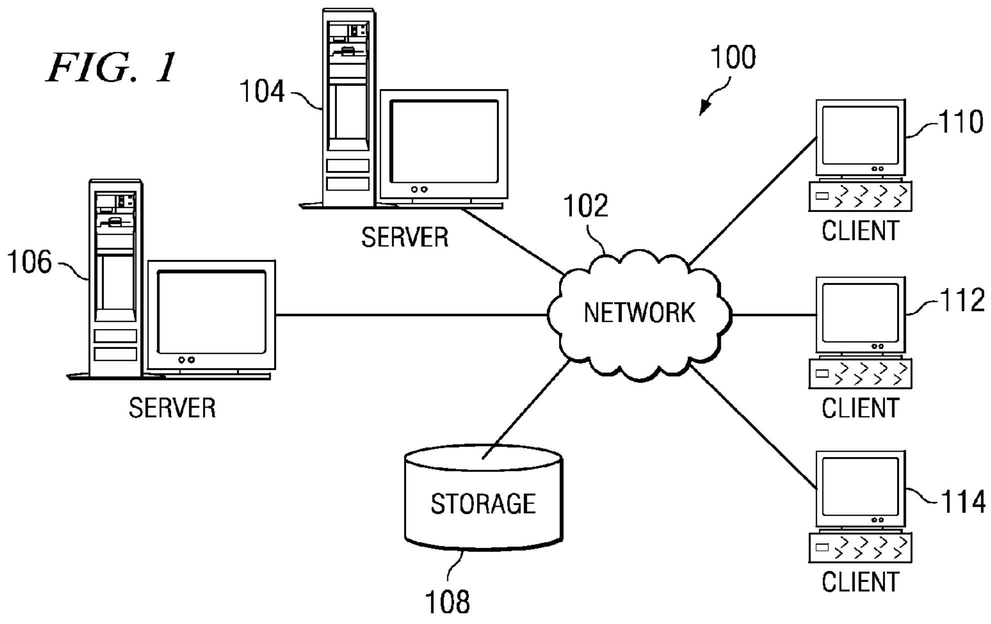
FIG. 1 depicts a pictorial representation of a network of data processing systems in which aspects of the present invention may be implemented.
Figure 2:
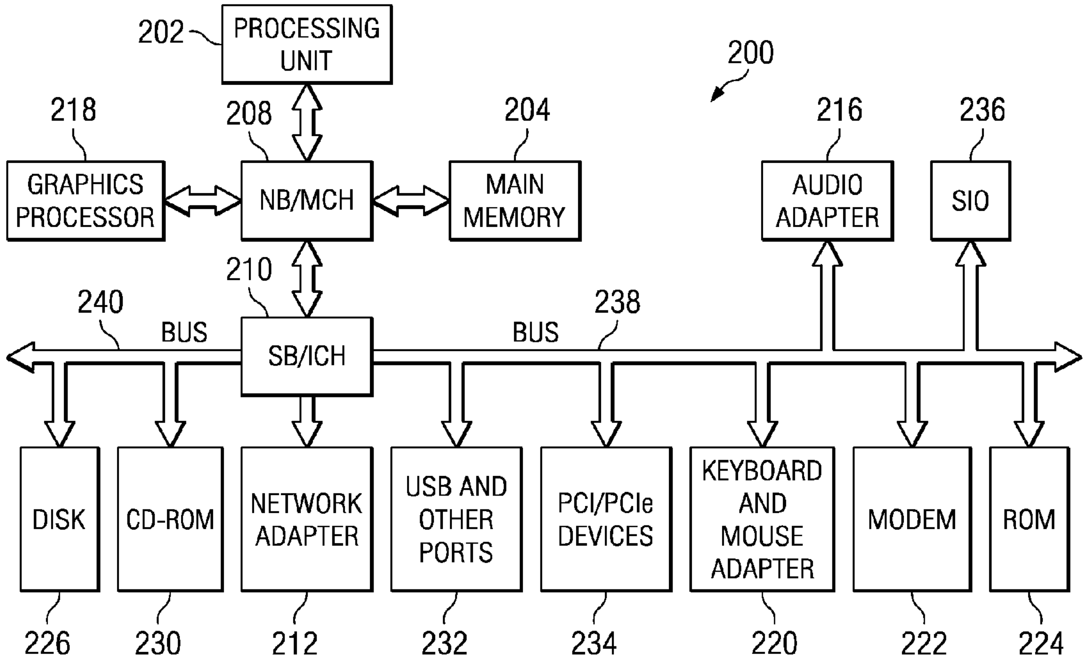
FIG. 2 is a block diagram of a data processing system in which aspects of the present invention may be implemented.

The aspects of the present invention provide a method, data processing system and computer usable code for converting after image data into a delta level change. A delta level change describes the changes to an object graph by annotating each property change in the object graph as a create, update, or delete. The data processing device may be a stand-alone computing device or may be a distributed data processing system in which multiple computing devices are utilized to perform various aspects of the present invention. Therefore, the following FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 208 and south bridge and input/output (I/O) controller hub (ICH) 210. Processing unit 202, main memory 204, and graphics processor 218 are connected to north bridge and memory controller hub 208. Graphics processor 218 may be connected to north bridge and memory controller hub 208 through an accelerated graphics port (AGP).

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 210 through bus 238. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 210 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 210.

An operating system runs on processing unit 202 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 202. Alternatively, a single processor system may be employed.

Instructions for the operating system, the object-oriented programming system, and applications or programs are located on storage devices, such as hard disk drive 226, and may be loaded into main memory 204 for execution by processing unit 202. The processes for embodiments of the present invention are performed by processing unit 202 using computer usable program code, which may be located in a memory such as, for example, main memory 204, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 204, read only memory 224, or a cache such as found in north bridge and memory controller hub 208 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

A mechanism is provided for converting after image data into a delta level change. A first after image business graph from an enterprise information system is transformed to a generic after image business graph. An after image business graph is the result of a query against a data source after the data source has had some type of change. Translating this after image business graph into a canonical form results in a generic after image business graph. Another transformation is performed transforming the generic after image business graph into a second after image business graph, using delta information from another enterprise information system is used to create a delta business graph. A final transformation is performed to convert the delta business graph into a generic delta business graph. The delta business graph is used by business process logic that requires a delta business graph as part of its data contract.

Figure 3:
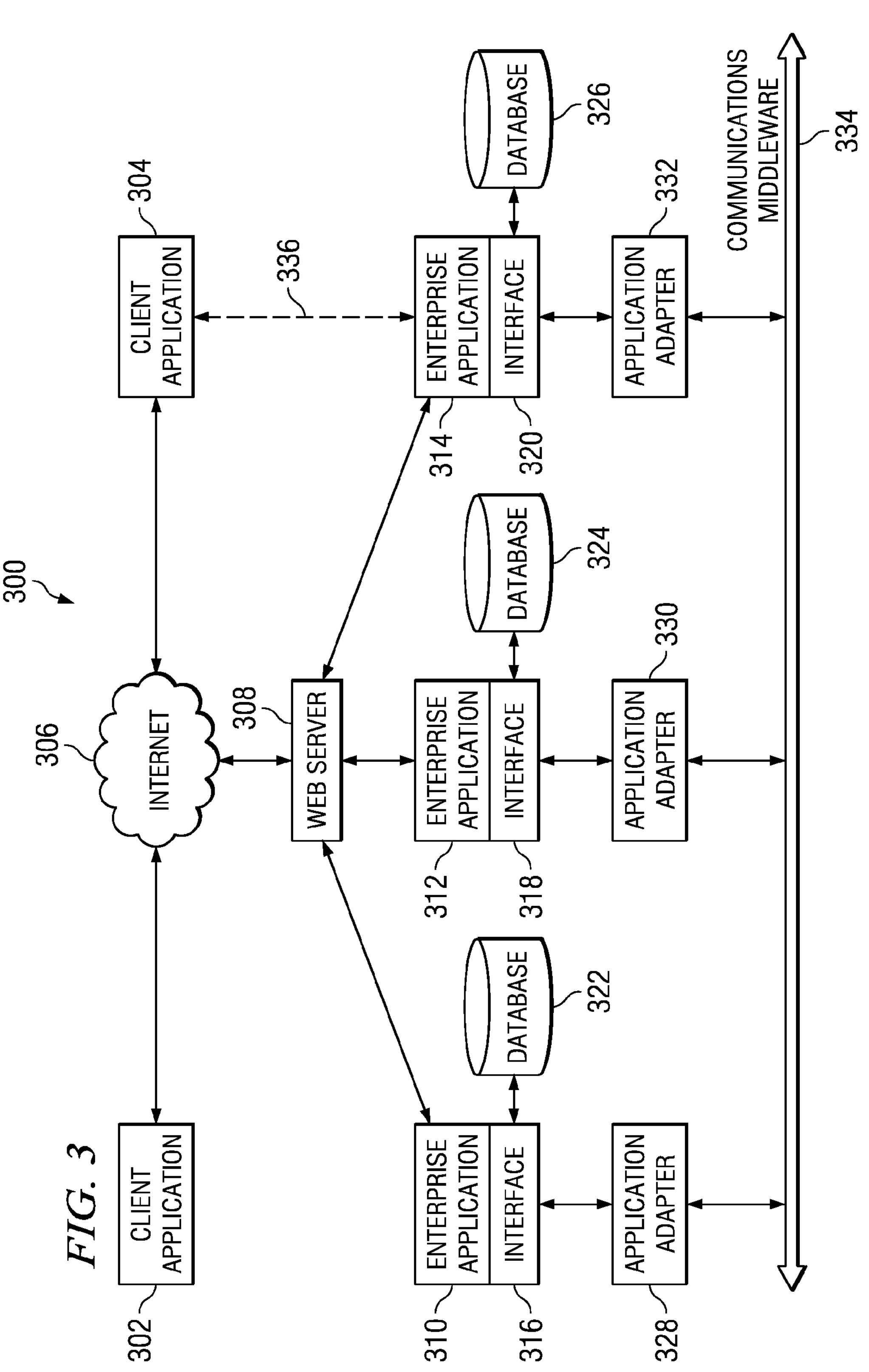
FIG. 3 is a functional block diagram of an enterprise application architecture in accordance with an illustrative embodiment of the present invention.

Turning to FIG. 3, a functional block diagram of the architecture of an enterprise application is depicted in accordance with an illustrative embodiment of the present invention. In the traditional enterprise architecture 300, client applications 302 and 304, access enterprise applications 310, 312, and 314 through Internet network 306 and Web server 308. Although in newer enterprise architectures, client applications may access an enterprise application directly as show in connection 336 from client application 304 to enterprise application 314. Internet network 306 and Web server 308 are similar to network 102 and server 104 of FIG. 1. Client application 302 and client application 304 may be an application running on clients 108, 110, and 112 of FIG. 1. Each enterprise application 310, 312, and 314 contains interfaces 316, 318, and 320 to access databases 322, 324, and 326. Databases 322, 324, and 326 are similar to storage 106 of FIG. 1 and may any type of data structure.

Figure 4:
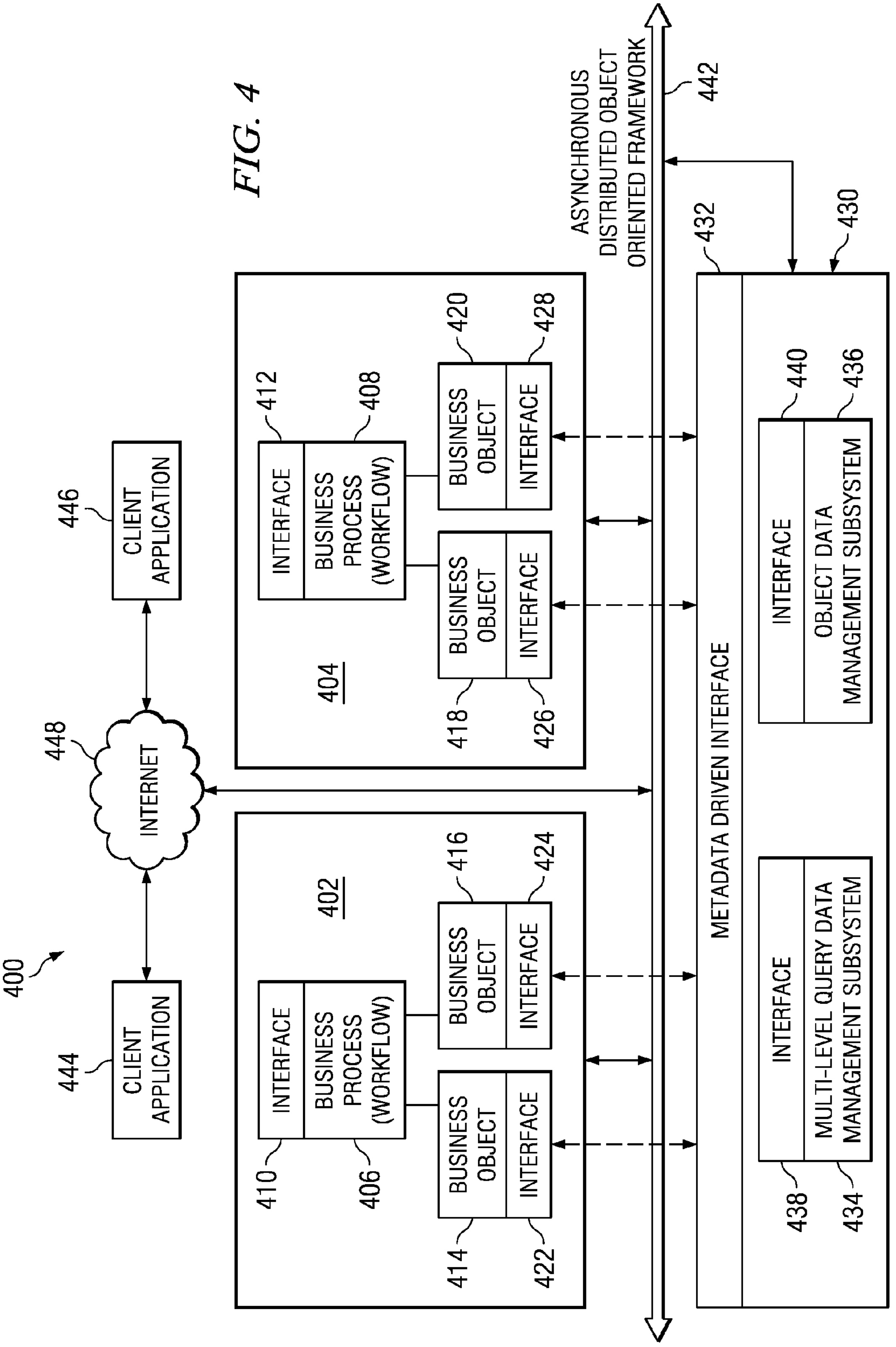
FIG. 4 is a functional block diagram of a services oriented architecture in accordance with an illustrative embodiment of the present invention.

Turning now to FIG. 4, a functional block diagram of a services oriented architecture is depicted in accordance with an illustrative embodiment of the present invention. Services oriented architecture 400 is a software platform that caters to the deployment of runtime component services 402 and 404. Software component services 402 and 404 are two-layer abstractions in which the upper layer specifies business processes 406 and 408 as mini automated workflows. Access to the business processes 406 and 408 is through interfaces 410 and 412 which may be any type of interface such as an extensible markup language (XML) or Internet inter-ORB protocol (IIOP) interface. The lower layer consists of business objects 414, 416, 418, and 420 that implement the information and data models on which the business processes operate. Business objects use metadata driven (MDD) interfaces 422, 424, 426, and 428 to interact with the enterprise repository 430, using enterprise repository 430 as their persistent storage.

Enterprise repository 430 is comprised of metadata driven interface 432, multi-level query data management subsystem 434, and object data management subsystem 436. Both multi-level query data management subsystem 434 and object data management subsystem 436 have interfaces 438 and 440 to interact with metadata driven interface 432 of enterprise repository 430. Interfaces 412, 432, 438, and 440 may be any type of interface such as an extensible markup language (XML), Internet inter-ORB protocol (IIOP), or interface definition language (IDL) interface.

Asynchronous distributed object oriented framework 442 provides the framework for client applications 444 and 446 through Internet 448 to access enterprise repository 430 and software runtime component services 402 and 404. In this approach, new services are created as new run-time deployable components. The services are built from the collaboration of business objects 414, 416, 418, and 420 that are themselves runtime deployable components 402 and 404. In a normal component, the information model is mapped directly to the enterprise repository 430. It is this tight coupling between the business objects 414, 416, 418, and 420 and its enterprise repository 430 that induces inflexibility into a typical enterprise. The metadata aware business objects approach removes the rigid constraints between business objects 414, 416, 418, and 420 and enterprise repository 430. With the metadata interface, enterprise repository 430 needs of business objects 414, 416, 418, and 420 can be dynamically created on the fly. In addition, new relationships and associations between component model specifications can also be dynamically created. This approach paves the way for a new breed of enterprise software, one in which arbitrary interaction and interoperation may be made between components to define the services offered by the enterprise. Software component services 402 and 404 are services that are offered by an application such as enterprise applications 310, 312, and 314 of FIG. 3. Enterprise repository 430 is a storage area such as databases 322, 324, and 326 of FIG. 3.

Figure 5:
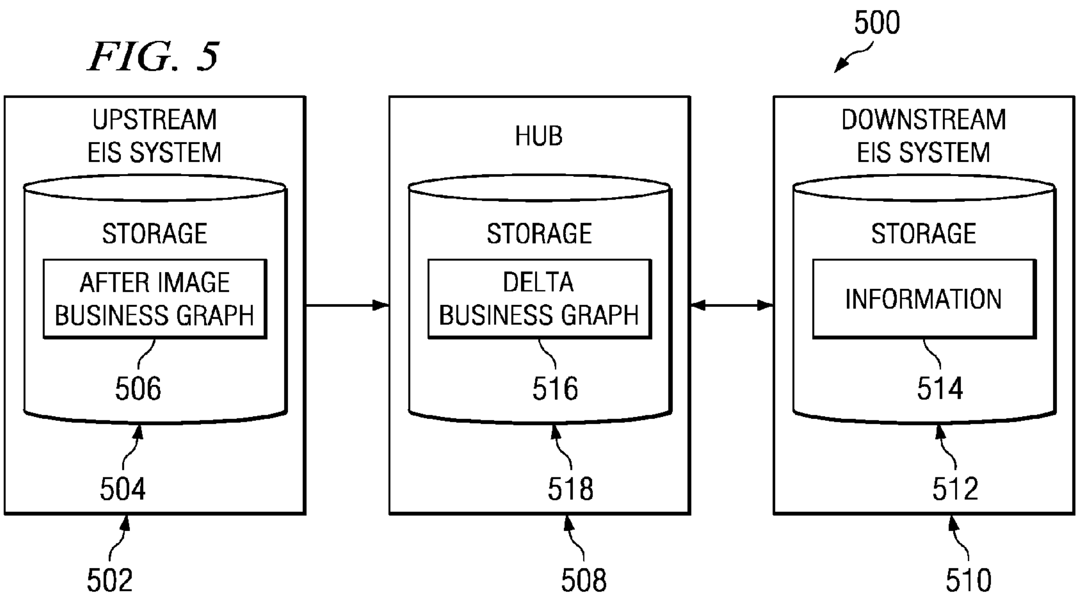
FIG. 5 is a functional block diagram of an exemplary conversion architecture in accordance with an illustrative embodiment of the present invention.

FIG. 5 is a functional block diagram of exemplary conversion architecture 500 in accordance with an illustrative embodiment of the present invention. Conversion architecture 500 is a software mechanism that two enterprise information systems (EIS), upstream enterprise information system 502 and downstream enterprise information system 510. Upstream enterprise information system 502 and downstream enterprise information system 510 are enterprise information systems where enterprise applications are run such as enterprise applications 310, 312, and 314 of FIG. 3. Conversion architecture 500 is a software mechanism that takes after image business graph 506 from storage unit 504 in upstream enterprise information system 502 and utilizes stored information 514 in storage unit 512 of downstream enterprise information system 510 to convert after image business graph 506 into delta business graph 516 in hub 508. Delta business graph 516 may be stored in any type of data structure such as storage unit 518. The conversion of after image business graph 506 into delta business graph 516 is described in FIG. 6. Delta business graph 516 is a generic business graph as it is not in the format of either upstream enterprise information system 502 or downstream enterprise information system 510.

Figure 6:
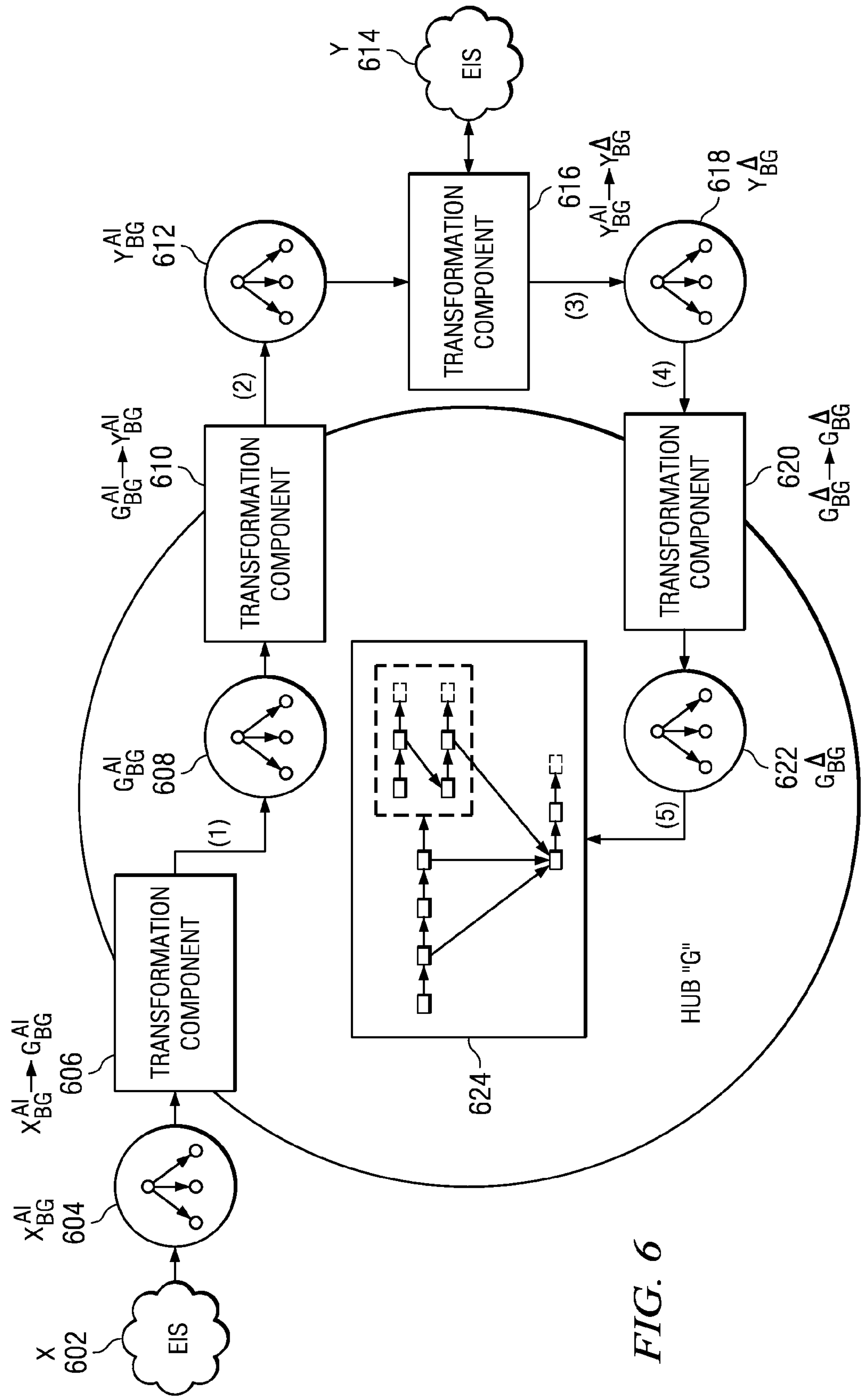
FIG. 6 is an illustration of an exemplary conversion of an after image business graph into a delta business graph in accordance with an illustrative embodiment of the present invention.

FIG. 6 is an illustration of an exemplary conversion of an after image business graph into a delta business graph in accordance with an illustrative embodiment of the present invention. The exemplary conversion demonstrates enterprise information system X 602 publishing X after image business graph 604, represented by X AIBG. X after image business graph (X AIBG) 604 goes through transformation component 606 that transforms X after image business graph 604 (X AIBG), which is an Application Specific Business Object (ASBO) with respect to enterprise information system X, into G after image business graph (G AIBG) 608. G after image business graph (G AIBG) 608 is a hub canonical generic business object representation of x after image business graph 604.

The transformation performed by transformation component 606 may be performed by mapping the application specific object graph that comes into a generic object graph. The precise semantics of this mapping depends on the object graph coming in, which is application specific, and the target object graph, which is the generic form. The mapping will be unique for each to/from set of object graphs. For example, an application specific business object is SAPCustomer, which has fields in it that are specific to SAP. Customer is a generic business object, which has fields in it that are related to customer but do not pertain to any one specific enterprise information system.

A reverse mapping is then performed to transform G after image business graph (G AIBG) 608 into Y after image business graph 612 (Y AIBG). Forward mapping is SAPCustomer to Customer, a reverse mapping example would be Customer being mapped to SAPCustomer—the opposite mapping. The transformation follows the normal pattern leveraging of transformation component 610 that transforms G after image business graph (G AIBG) 608 into Y after image business graph 612 (Y AIBG). Thus, the transformation performed in transformation component 610 is conceptually similar to the transformation performed in transformation component 606, but instantiated very differently. That is, for example, the transformation performed in transformation component 610 is responsible for mapping from SAPCustomer to Customer, or from Customer to SAPCustomer, or from PSFTCustomer to Customer, or vice versa. In other words, one mapping is SAPCustomer to Customer, while the other mapping is Customer to PeopleSoftCustomer.

A key portion of this exemplary conversion is the utilization of information available from enterprise information system Y 614 that is used to transform the Y after image business graph 612 (Y AIBG) into a Y delta business graph (Y ABG) 618 through the normal pattern leveraging of transformation component 616. A delta level change describes the changes to an object graph by annotating each property change in the object graph as a create, update, or delete. The information may be new information or previously stored information with relation to previous conversions.

Thus, for example, an earlier conversion may have consisted of four elements but a current conversion consists of only five elements. Thus, enterprise information system Y 614 can provide transformation information that elements previously converted are not part of this conversion.

Normal pattern leveraging of transformation component 620 transforms Y delta business graph (Y ΔBG) 618 into G delta business graph (G ΔBG) 622. Finally, an exemplary demonstration of a potential use of the above described mechanism is shown by using G delta business graph (G ΔBG) 622 in Flow Manager or Adaptive Entity process 624. Flow Manager or Adaptive Entity process 624 may be any type of business object graph that requires a delta form as part of its contract. That is Flow Manager or Adaptive Entity process 624 has an expectation of this type of data, which is standardized as part of the SDO specification.

To reiterate the utilization of information available from enterprise information system Y 614 as the key concept, the following example is provided. If the upstream system is an order taking/modification system, and an order is created, initially, that order and all the order's line items are passed to the downstream system. The same order, with, for example, four line items exists upstream and downstream in both persistent stores. Then, when the upstream system is updated, through a user adding an order line item to the order and modifying one of the existing order line items, the upstream adapter queries the upstream system to determine the after image, which is an order, with five order line items. The after image does not have the "delta" information yet, that is, the after image does not know that one was added and one was modified, the after image merely knows what the new version looks like.

Continuing with the example, the data is then passed to the downstream system, through the canonical mapping pattern of going X to G (606) and then G to Y (610). The downstream code in transformation component 616 looks in the database at the first version of the order, and compares it to the current version of the order. Thus, it is able to determine that the fifth order line item was added, and the order line is annotated to the delta object graph with some information that describes that this fifth line item is "created". The transformation component 616 also identifies that one of the existing line items was modified, and annotates the delta graph that one of the properties in the modified order line item was "modified" or "updated". Now, the delta business graph is of type Y, and understood by the Y system, so it is, for example, a PSFTCustomer, understood by the PSFT enterprise information system. The delta business graph is then transformed through transformation component 620 back into a generic object of type G. Now that this has occurred, some business logic that requires a G object in delta form can now process that data.

Figure 7:
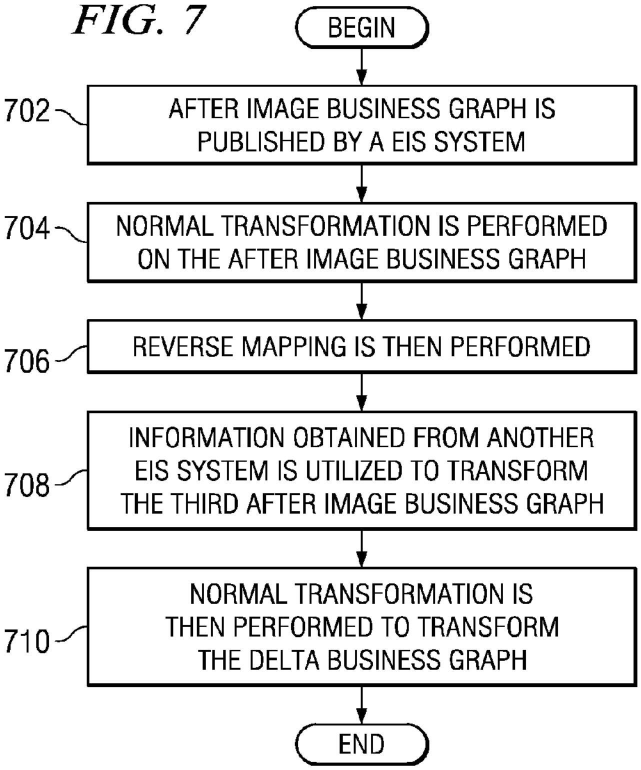
FIG. 7 depicts a flow diagram illustrating an exemplary operation of converting an after image business graph into a delta business graph in accordance with an illustrative embodiment of the present invention.

FIG. 7 depicts a flow diagram illustrating an exemplary operation of converting an after image business graph into a delta business graph in accordance with an illustrative embodiment of the present invention. As the operation begins a first after image business graph is published by a first enterprise information system (step 702). A first transformation is performed on the first after image business graph, which transforms the first after image business graph into a second after image business graph (step 704). A reverse mapping is then performed which transforms the second after image business graph into a third after image business graph by using a second transformation (step 706). This second transformation follows the normal pattern leveraging the transformation component that transforms the second after image business graph into the third after image business graph.

As a key point in this exemplary operation, information obtained from a second enterprise information system is utilized to transform the third after image business graph into a first delta business graph using a third transformation (step 708). A fourth transformation is then performed to transform the first delta business graph into a second delta business graph (step 710), with the operation ending thereafter.

Thus, the described mechanism converts an after image data into a delta level change. Delta information from a second enterprise information system is used in conjunction with a transformed after image business graph to produce a delta business graph.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing after image data, the method comprising:

receiving, by a hub from a first enterprise information system, a first after image business graph that is in a first format, wherein the first after image business graph comprises a result of a query against a data source after the data source has changed, and wherein the first after image business graph does not show changes in the data source;

performing, by the hub, a first transformation on the first after image business graph to produce a generic after image business graph that is in a generic form;

performing, by the hub, a second transformation on the generic after image business graph to form a second after image business graph that is in a second format;

receiving, from a second enterprise information system, information defining a delta, wherein the delta represents changes to the first after image business graph;

performing a third transformation of the second after image business graph to form a delta business graph using the delta, wherein the delta business graph is in the second format; and performing, by the hub, a fourth transformation of the delta business graph to form a generic delta business graph that is in the generic form, wherein the generic delta business graph shows changes in the data source.

2. The computer implemented method of claim 1, wherein the first enterprise information system is an order taking and modification system.

3. The computer implemented method of claim 1, wherein the first after image business graph and the generic delta business graph contain data objects in a service data objects (SDO) framework.

4. The computer implemented method of claim 1, wherein the delta is a difference between the generic after image business graph and a previous after image business graph.

5. The computer implemented method of claim 1, wherein the first after image business graph and the information defining the delta are stored in a persistent store.

6. The computer implemented method of claim 1, wherein the first enterprise information system and the second enterprise information system comprise different system formats.

7. The computer implemented method according to claim 1, wherein the hub performs the first transformation using a first transformation component included in the hub;

wherein the hub performs the second transformation using a second transformation component that is included in the hub;

and wherein the hub performs the fourth transformation using a third transformation component that is included in the hub.

8. A data processing system comprising:

a bus system;

a communications system connected to the bus system;

a memory connected to the bus system, wherein the memory includes a set of instructions; and a processing unit connected to the bus system, wherein the processing unit executes the set of instructions to receive, by a hub from a first enterprise information system, a first after image business graph that is in a first format, wherein the first after image business graph comprises a result of a query against a data source after the data source has changed, and wherein the first after image business graph does not show changes in the data source; perform, by the hub, a first transformation on the first after image business graph to produce a generic after image business graph that is in a generic form; perform, by the hub, a second transformation on the generic after image business graph to form a second after image business graph that is in a second format; receive, from a second enterprise information system, information defining a delta, wherein the delta represents changes to the first after image business graph; perform a third transformation of the second after image business graph to form a delta business graph using the delta, wherein the delta business graph is in the second format; and perform, by the hub, a fourth transformation of the delta business graph to form a generic delta business graph that is in the generic form, wherein the generic delta business graph shows changes in the data source.

9. The data processing system of claim 8, wherein the delta is a difference between the generic after image business graph and a previous after image business graph.

10. The data processing system of claim 8, wherein the first after image business graph and the information defining the delta are stored in a persistent store.

11. The data processing system of claim 8, wherein the first enterprise information system and the second enterprise information system comprise different system formats.

12. The data processing system according to claim 8, wherein the hub performs the first transformation using a first transformation component included in the hub;

wherein the hub performs the second transformation using a second transformation component that is included in the hub; and wherein the hub performs the fourth transformation using a third transformation component that is included in the hub.

13. A computer program product comprising:

a computer readable storage medium including computer usable program code embodied therein for processing after image data, the computer program product including;

computer usable program code for receiving, by a hub from a first enterprise information system, a first after image business graph that is in a first format, wherein the first after image business graph comprises a result of a query against a data source after the data source has changed, and wherein the first after image business graph does not show changes in the data source;

computer usable program code for performing, by the hub, a first transformation on the first after image business graph to produce a generic after image business graph that is in a generic form;

computer usable program code for performing, by the hub, a second transformation on the generic after image business graph to form a second after image business graph that is in a second format;

computer usable program code for receiving, from a second enterprise information system, information defining a delta, wherein the delta represents changes to the first after image business graph;

computer usable program code for performing a third transformation of the second after image business graph to form a delta business graph using the delta, wherein the delta business graph is in the second format; and computer usable program code for performing, by the hub, a fourth transformation of the delta business graph to form a generic delta business graph that is in the generic form, wherein the generic delta business graph shows changes in the data source.

14. The computer program product of claim 13, wherein the delta is a difference between the generic after image business graph and a previous after image business graph.

15. The computer program product of claim 13, wherein the first after image business graph and the information defining the delta are stored in a persistent store.

16. The computer program product of claim 13, wherein the first enterprise information system and the second enterprise information system comprise different system formats.

17. The computer program product according to claim 13, wherein the hub performs the first transformation using a first transformation component included in the hub;

wherein the hub performs the second transformation using a second transformation component that is included in the hub; and wherein the hub performs the fourth transformation using a third transformation component that is included in the hub.

* * * * *